(12) United States Patent
Hsu

(10) Patent No.: US 7,344,346 B2
(45) Date of Patent: Mar. 18, 2008

(54) FAST FASTEN AND LOOSE RESISTANT BOLT AND NUT STRUCTURE

(76) Inventor: Hung-Chih Hsu, No. 23, Lane 339, Chungshan 1st Rd., Luchou City, Taipei Hsien (TW)

( * ) Notice: Subject to any disclaimer, the term of this patent is extended or adjusted under 35 U.S.C. 154(b) by 0 days.

(21) Appl. No.: 11/200,064

(22) Filed: Aug. 10, 2005

(65) Prior Publication Data

US 2007/0036629 A1   Feb. 15, 2007

(51) Int. Cl.
*F16B 21/00* (2006.01)
(52) U.S. Cl. .................. 411/551; 411/21; 411/417; 411/520
(58) Field of Classification Search ............... 411/417, 411/182, 520, 521, 21, 22, 338, 349, 551
See application file for complete search history.

(56) References Cited

U.S. PATENT DOCUMENTS

| | | | | |
|---|---|---|---|---|
| 2,560,110 A | * | 7/1951 | Horn | 402/52 |
| 2,581,288 A | * | 1/1952 | Pletcher, Jr. | 411/520 |
| 2,582,580 A | * | 1/1952 | Bedford, Jr. | 411/520 |
| 2,967,557 A | * | 1/1961 | Tait et al. | 411/349 |
| 3,027,670 A | * | 4/1962 | Kramer et al. | 428/542.4 |
| 3,269,251 A | * | 8/1966 | Bass | 411/21 |
| 5,036,674 A | * | 8/1991 | Chang | 62/77 |
| 5,324,147 A | * | 6/1994 | Leon | 411/182 |
| 5,704,752 A | * | 1/1998 | Logerot | 411/503 |
| 6,688,826 B2 | * | 2/2004 | Agha et al. | 411/352 |

* cited by examiner

*Primary Examiner*—Flemming Saether
(74) *Attorney, Agent, or Firm*—Birch, Stewart, Kolasch & Birch, LLP

(57) ABSTRACT

A bolt and nut structure has a bolt nail, a nut nail and an elastic tube. The elastic tube has several outward plates, several convex blocks, a convex edge, and an elastic gap. The edge of the elastic tube has a ring hook. Inward plates on an inner side of the elastic tube will slide along a planar surface of the bolt nail but will engage an oval surface of the bold nail. Accordingly, the elastic tube is first placed in an interior space of the nut nail, an objected is then clamped between the bolt and nut nail, and the bolt nail is rotated 90 degree to fasten the object. The bolt nail can also be rotated 90 degree in an opposite direction to loosen the bolt nail. Therefore the bolt and nut structure are very convenient in use.

10 Claims, 5 Drawing Sheets

FAST FASTEN AND LOOSE RESISTANT BOLT AND NUT STRUCTURE

BACKGROUND OF THE INVENTION

I. Field of the Invention

The present invention relates to a device for a quick fastening bolt and nut structure which is resistant to loosening and especially to a bolt and nut nail structure including a bolt nail, a nut nail, and an elastic tube.

II. Description of the Prior Art

Traditional bolt and nuts are used to clamp an object. As shown in FIG. 1, a thread a1 in the inner container wall of nut nail a, and a thread b1 on the front pole of bolt nail b is provided which are threaded in opposite directions. In use, the nut nail a is put into the hole c1 of an object and then bolt nail b is screwed to tightly fasten the object. In order to tightly fasten the object c, sometimes bolt nail b is screwed to the end of the thread, or the thread circles of bolt nail b are increased to meet the requirement of thinner objects. On the other hand, for convenience, thread b1 of bolt nail b can be slightly smaller than that of nut nail a1. Such kind of structure sometimes needs some sort of improvement.

SUMMARY OF THE INVENTION

It is therefore a primary object of the present invention to provide a device for quickly fastening and resisting loosening of a bolt and nut nail structure which is convenient to use and once fasten, is resistant to loosening.

It is a further object of the present invention to have a bolt and nut nail structure which primarily comprises a bolt nail, nut nail, and elastic tube which has several outward plates at outer wall, several convex blocks in the middle, and a convex edge extended out with an elastic gap. A ring hook is in a front open end of the elastic tub and several inward plates are provided. The container space formed in the nut nail holds the elastic tube. The bolt nail has an oval shape with a thread on the convex oval sides and the bolt nail also has planar narrower sides to accommodate insertion of inward plates of the elastic tube. The elastic tube can be initially be placed in the nut nail.

The elastic tube should at first be placed into the container of nut nail as noted above. The elastic tube will have an outer diameter which is slightly greater than the interior space of the nut nail. The elastic gap of the elastic tube can slightly adjust so that the elastic tube will fit into the container. The outward plates at a front end of the elastic tube, the convex blocks in the middle of the elastic tube, and the convex edge at the end of the elastic tube firmly engage the inner wall of the nut nail to prevent loosening. In use, the nut nail is placed through a predrilled hole of an object and then the bolt nail into nut nail are inserted. The inward plates of the elastic tube slide along the planar sides of the bolt nail, and the threads of the bolt nail engage with the ring hook of the elastic tube, whereafter the bolt nail is rotated 90 degree to fasten the bolt. The oval surface of the bolt nail will engage the inward plates of the elastic tube to mesh the threads with the ring hook of the elastic tube to firmly and fasten the bolt nail and nut nail. Thereafter, owing to the elasticity of the inward plates, these inward plates will maintain engagement with the surface of the bolt nail, while the thread on the oval surface of bolt nail mesh with the ring hook to tightly fasten the bolt and nut nail together while preventing easy loosening.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The accomplishment of the above-mentioned object of the present invention will become apparent from the following description and its accompanying drawing which disclose illustrative and embodiment of the present invention, and are as follows.

DESCRIPTION OF THE PREFERRED EMBODIMENT

Figure 1:
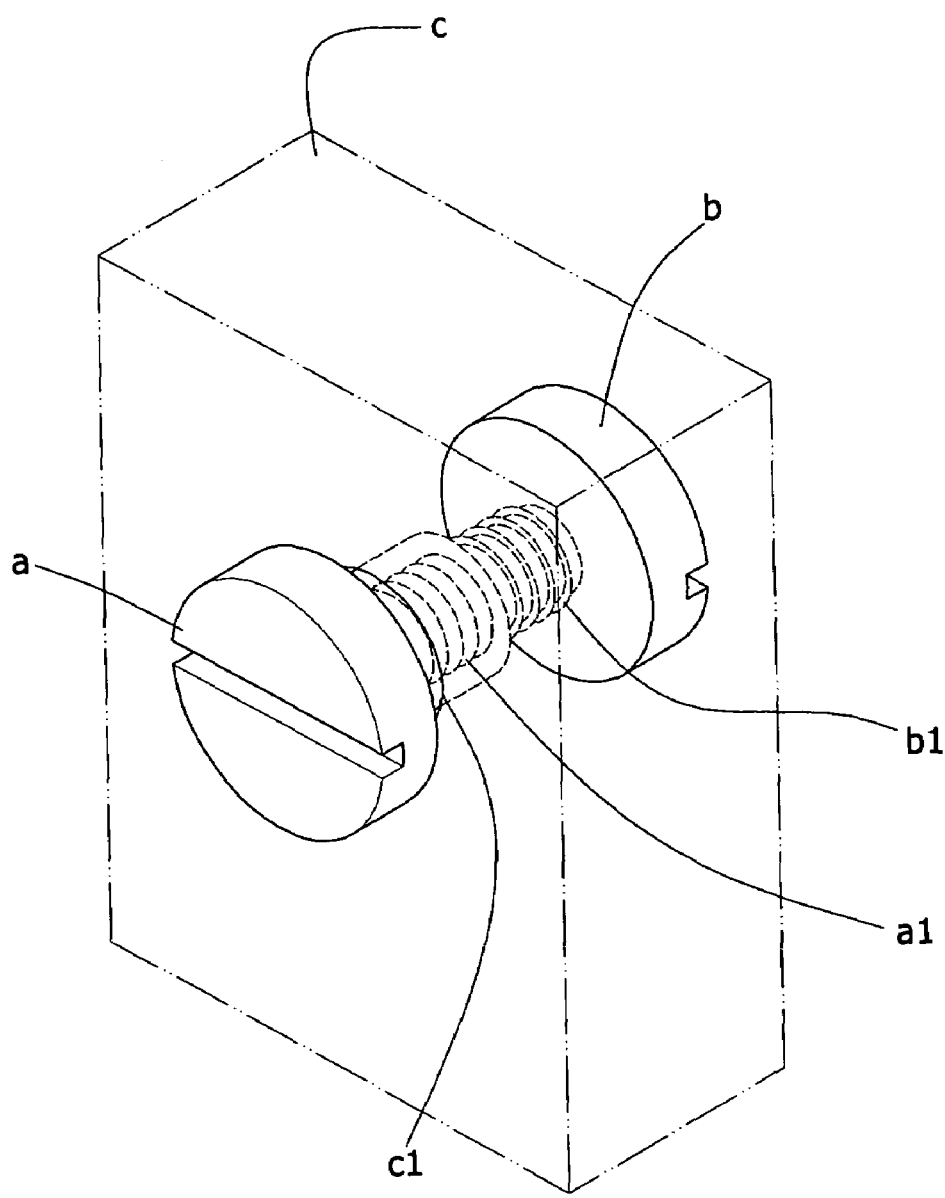
FIG. 1 is a perspective view of a conventional bolt and nut.
Figure 2:
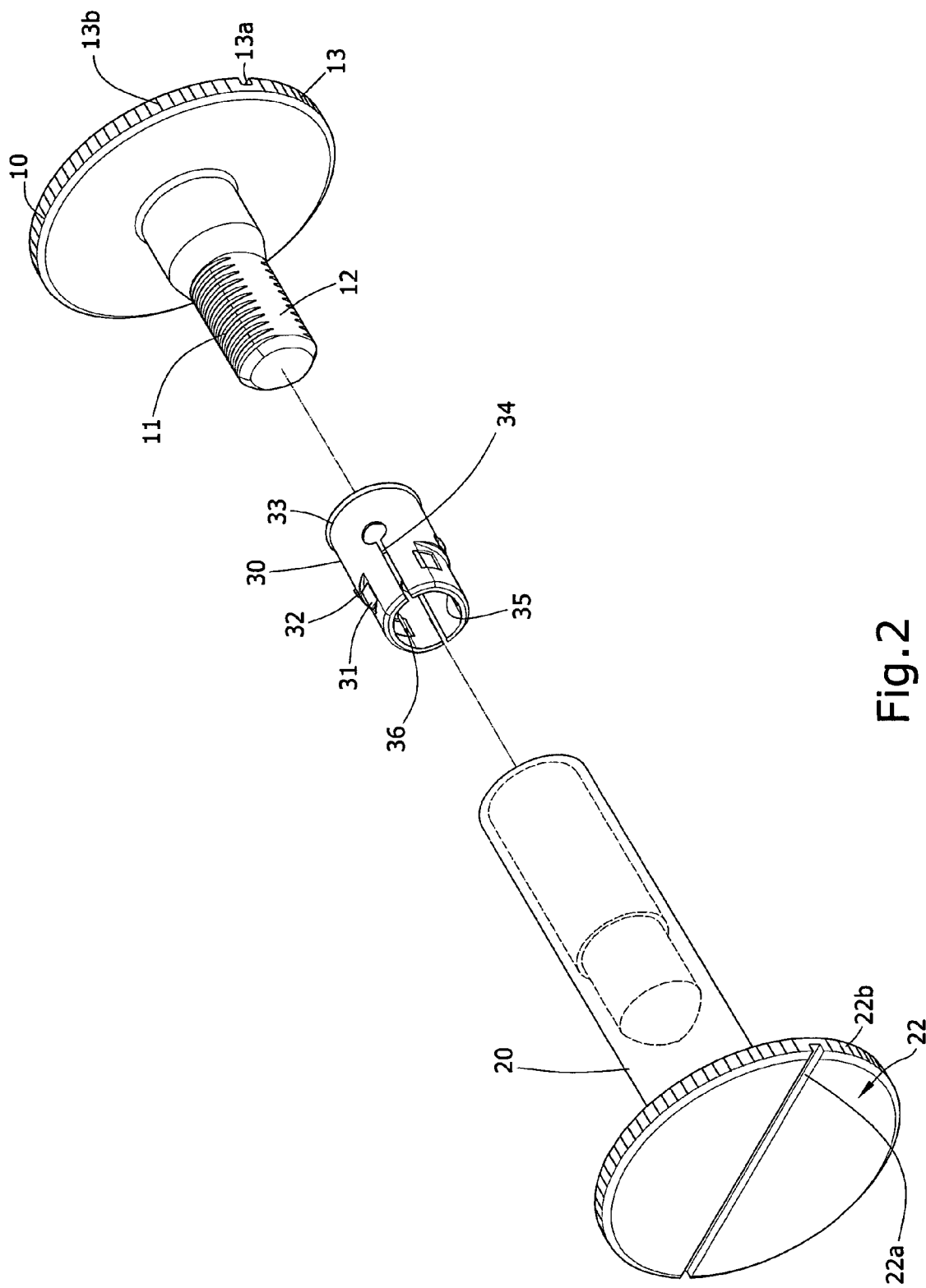
FIG. 2 is a perspective view of the present invention.
Figure 3:
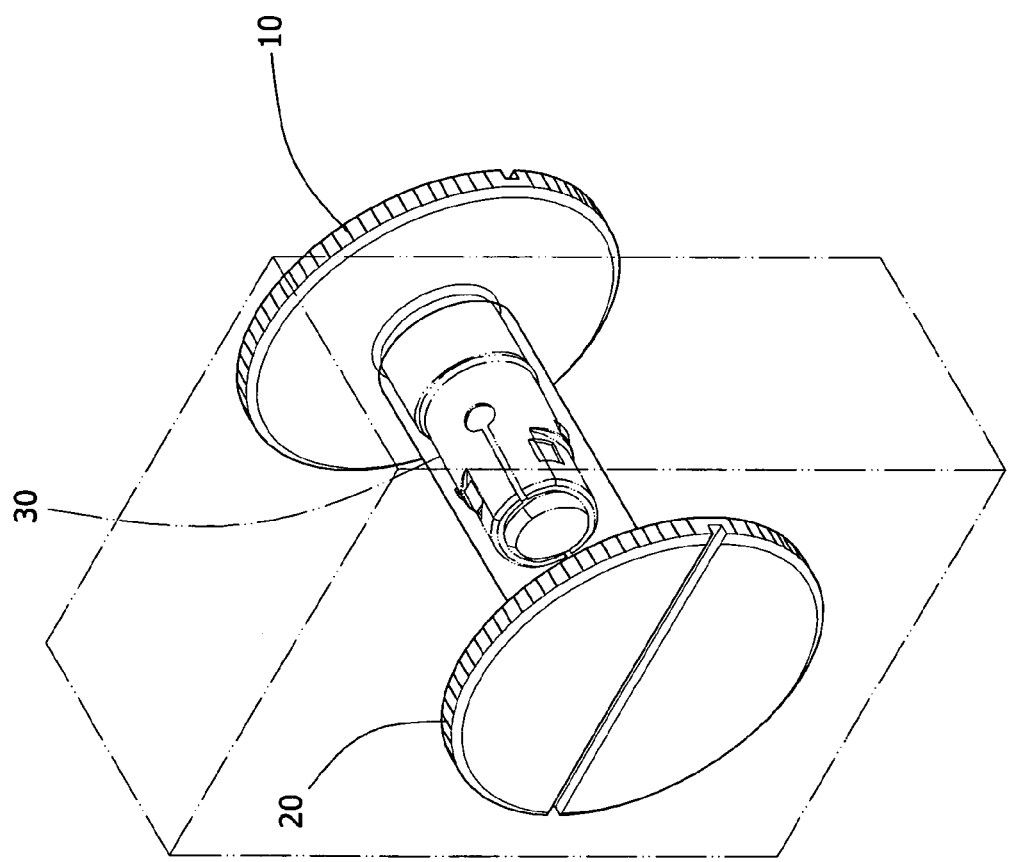
FIG. 3 is a perspective assembled view of the present invention.
Figure 4:
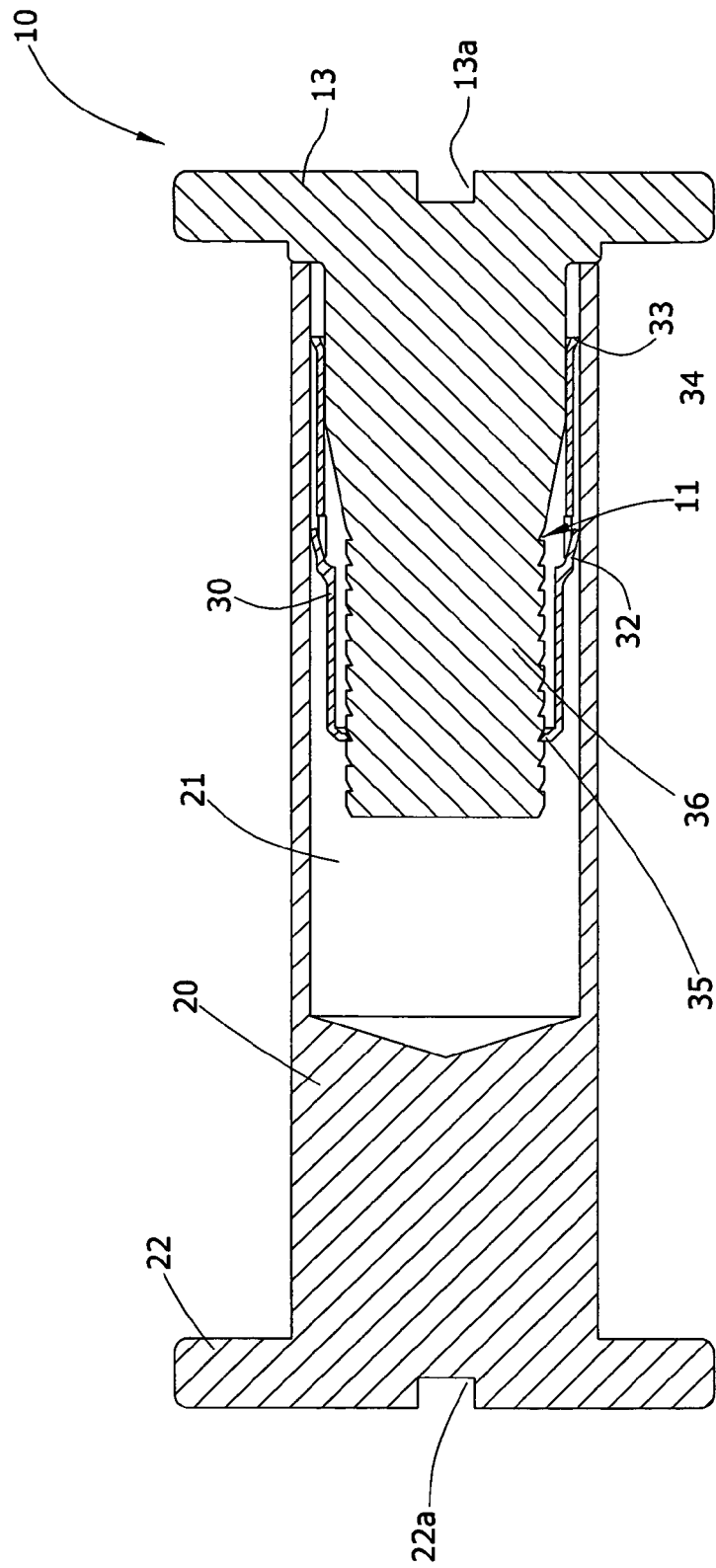
FIG. 4 is a cross-sectional assembled view of the nut nail and elastic tube of the present invention.

Refer to FIGS. 2, 3 and 4, the present invention has a bolt and nut structure which includes a bolt nail 10, a nut nail 20, and an elastic tube 30.

The bolt nail 10 has an oval shape with a cut front end and threads 11 on the oval sides. Two sides 12 of the bolt nail are planar and will accommodate movement of inward plates 36. These plates 36 are provided on elastic tube 30. A groove 13a is on the head 13 for receiving a screw driver. Markings 13b are on the round edge of nail head 13 for the convenience of manual rotation.

Within the nut nail 20 a container or interior space 21 is provided for receiving the elastic tube 30. Aa groove 22a is provided on the head 22 for receiving a screwdriver. Markings 22b are on the round edge of nail head 22 for the convenience of manual rotation.

The elastic tube 30 has a tube shape with several outward plates 31 around the outer wall of the elastic tube 30, several convex blocks 32 set around the middle part of the elastic tube, an outward convex edge 33 at the end, and an elastic gap 34. The elastic gap will absorb pressure from forcing the elastic tube into the container or interior of the nut nail 20. A ring hook 35 is provided at a mouth of the elastic tube 30 to hook the thread of the bolt nail 10. Inward plates 36 are adjacent the outward plates 31 around the inner wall of the elastic tube 30.

When combined, the elastic tube 30 is first placed into the container or interior space 21 of nut nail 20. Because of the outer diameter of the elastic tube 30 being slightly greater than the space 21, the elastic gap 34 of the elastic tube 30 will slightly deform to adjust to the size of the space 21. The outward plates 31 at the front end, the convex blocks 32 at the middle, and the convex edge 33 at the end of elastic tube 30 will firmly engage with the inner wall of the nut nail 20 to prevent loosening of the elastic tube 30 from the nut nail 20.

Figure 6:
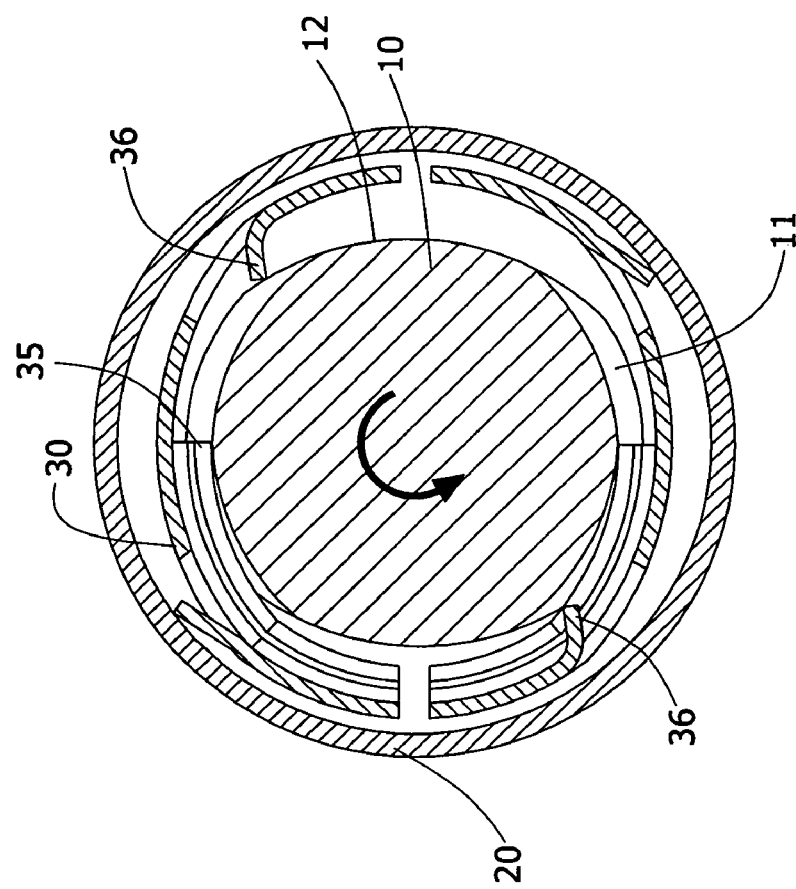
FIG. 6 is a view of assembly of the present invention.
Figure 5:
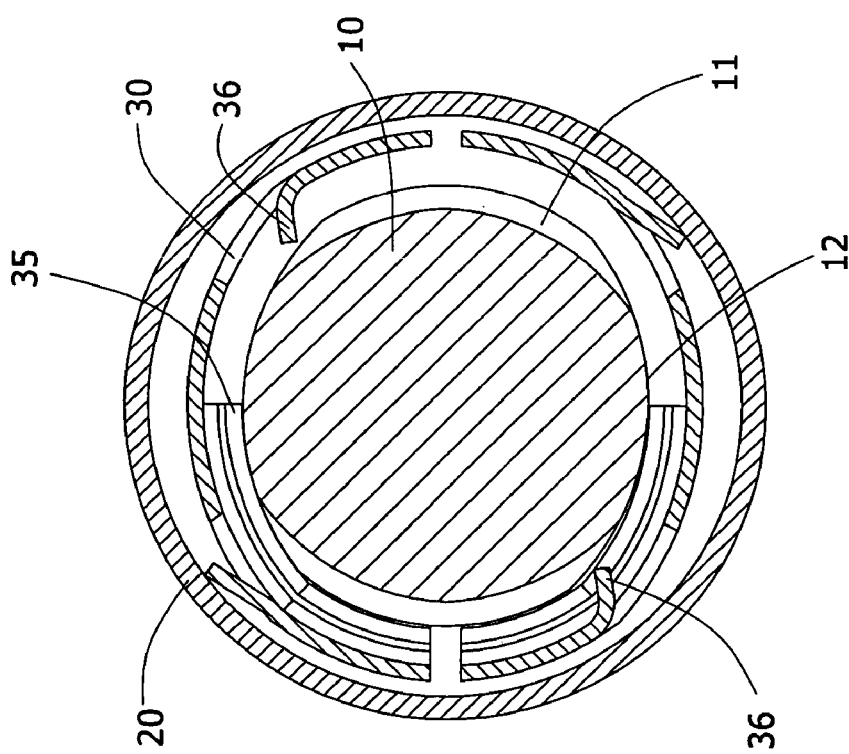
FIG. 5 is a view during assembly of the present invention.

Referring to FIGS. 5 and 6, the nut nail 20 is then inserted through a predrilled hole of an object. The the bolt nail 10 is placed into the nut nail 20, and the inward plates 36 of elastic tube 30 slide along the planar sides 12 of the bolt nail 10. When thread 11 of the bolt nail 10 engage with the ring hook 35 of the elastic tube 30, the bolt nail 10 is rotated 90 degree. The oval surface of the bolt nail 10 will engage the inward plates 36 to make thread 11 mesh with ring hook 35 firmly and quickly fasten the bolt nut 10 and the nut nail 20.

In summary, the present invention provides a bolt and nut structure with an elastic tube 30 which is inserted into the nut nail 20 in advance. The special oval type of bolt nail 10 firmly engages with the elastic tube 30 and is held in an object. The bolt and nut structure are easy and convenient to use, and can be fasten and loosened very quickly, and especially once fasten avoid unwanted loosening. Many changes and modifications in the above-described embodiments of the invention can, of course, be carried out without departing from the scope thereof. Accordingly, to promote the progress in science and the useful arts, the invention is disclosed and is intended to be limit only by the scope of the appended claim.

What is claimed is:

1. A bolt and nut structure comprising:
   a bolt nail having a thread and at least one planar surface extending alone a length thereof;
   a nut nail having an open, interior space; and
   an elastic tube having a plurality with outward plates, a plurality of convex blocks, a plurality of inward plates and a ring hook, at least one gap being provided in the elastic tube, the ring hook being at a front open end of the elastic tube and the at least one gap extending along a portion of a length of the elastic tube from the ring hook, the elastic tube being insertable into the open, interior space of the nut nail,
   the bolt nail being rotatable relative to the nut nail to be readily attachable to and detachable from one another, the elastic tube being between the bolt nail and the nut nail and the thread meshing with the ring hook when the bolt nail is attached to the nut nail.

2. The bolt and nut structure of claim 1, wherein the at least one planar surface accommodates the inward plates of the elastic tube during insertion of the bolt nail into the elastic tube, the bolt nail further having a head with a groove therein.

3. The bolt and nut structure of claim 2, wherein the head of the bolt nail further has a plurality of markings surrounding the nail head to increase friction.

4. The bolt and nut structure of claim 2, wherein the nut nail has a head with a groove extending across the head.

5. The bolt and nut structure of claim 1, wherein the nut nail has a head with a groove extending across the head.

6. The bolt and nut structure of claim 5, wherein the head of the nut nail has a plurality of markings surrounding the head to increase friction.

7. The bolt and nut structure of claim 1, wherein both the bolt nail and the nut nail have a head with a groove extending across the heads.

8. The bolt and nut structure of claim 1, wherein the at least one gap extends from the ring hook of the elastic tube and terminates before an opposed end of the elastic tube.

9. The bolt and nut structure of claim 1, wherein the outward plates and the inward plates are spaced a same distance from the front open end of the elastic tube.

10. The bolt and nut structure of claim 1, wherein the outward plates and the inward plates are spaced around a circumference of the elastic tube in a same plane.

* * * * *